United States Patent
Kang et al.

(10) Patent No.: US 10,000,655 B2
(45) Date of Patent: *Jun. 19, 2018

(54) HARD COATING COMPOSITION

(71) Applicant: LG CHEM, LTD., Seoul (KR)

(72) Inventors: Joon-Koo Kang, Daejeon (KR); Yeong-Rae Chang, Daejeon (KR); Sung-Don Hong, Daejeon (KR); Soon-Hwa Jung, Daejeon (KR); Eun-Kyu Her, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/423,420

(22) PCT Filed: Jul. 29, 2013

(86) PCT No.: PCT/KR2013/006773
§ 371 (c)(1),
(2) Date: Feb. 23, 2015

(87) PCT Pub. No.: WO2014/030845
PCT Pub. Date: Feb. 27, 2014

(65) Prior Publication Data
US 2015/0299505 A1    Oct. 22, 2015

(30) Foreign Application Priority Data

Aug. 23, 2012 (KR) .................. 10-2012-0092529
Jul. 26, 2013  (KR) .................. 10-2013-0089102

(51) Int. Cl.
| | | |
|---|---|---|
| C09D 133/14 | (2006.01) | |
| C08L 33/04 | (2006.01) | |
| C09D 135/02 | (2006.01) | |
| C08J 7/04 | (2006.01) | |
| C09D 105/16 | (2006.01) | |
| C09D 4/06 | (2006.01) | |
| C08J 5/18 | (2006.01) | |

(52) U.S. Cl.
CPC .............. C09D 133/14 (2013.01); C08J 5/18 (2013.01); C08J 7/042 (2013.01); C08J 7/047 (2013.01); C08L 33/04 (2013.01); C09D 4/06 (2013.01); C09D 105/16 (2013.01); C09D 135/02 (2013.01); C08J 2333/04 (2013.01); C08J 2367/02 (2013.01); C08J 2433/00 (2013.01); C08J 2433/08 (2013.01); Y10T 428/24917 (2015.01); Y10T 428/269 (2015.01); Y10T 428/2848 (2015.01); Y10T 442/10 (2015.04)

(58) Field of Classification Search
CPC ...... C09D 133/14; C09D 105/16; C09D 4/06; C09D 135/02; C08F 2/50; C08J 5/18; C08J 7/047; C08J 7/042; C08J 2333/04; C08J 2367/02; C08J 2433/00; C08L 33/04; Y10T 428/2848; Y10T 428/24917; Y10T 428/269; Y10T 442/10
See application file for complete search history.

(56) References Cited

U.S. PATENT DOCUMENTS

| | | |
|---|---|---|
| 4,902,578 A | 2/1990 | Kerr, III |
| 6,245,833 B1 | 6/2001 | Kang et al. |
| 6,489,015 B1 | 12/2002 | Tsuchiya et al. |
| 7,622,055 B2 | 11/2009 | Nakano et al. |
| 2003/0008162 A1 | 1/2003 | Oya et al. |
| 2004/0081831 A1 | 4/2004 | Shoshi et al. |
| 2004/0135159 A1 | 7/2004 | Siegel |
| 2005/0136252 A1 | 6/2005 | Chisholm et al. |
| 2005/0136273 A1 | 6/2005 | Hashimoto et al. |
| 2006/0134400 A1 | 6/2006 | Takada et al. |
| 2006/0286383 A1 | 12/2006 | Gilmer |
| 2007/0178297 A1 | 8/2007 | Takada et al. |
| 2007/0231566 A1 | 10/2007 | Yoneyama et al. |
| 2007/0237966 A1 | 10/2007 | Takao et al. |
| 2008/0145673 A1 | 6/2008 | Bonnard |
| 2008/0193722 A1 | 8/2008 | Tanaka |
| 2008/0218666 A1 | 9/2008 | Toyooka |
| 2008/0257216 A1* | 10/2008 | Ravyst .................. C08F 290/06 106/287.26 |
| 2008/0311351 A1 | 12/2008 | Hsu et al. |
| 2009/0169896 A1 | 7/2009 | Sohn et al. |
| 2009/0214871 A1 | 8/2009 | Fukuda et al. |
| 2010/0084037 A1* | 4/2010 | Ericsson .................. B32B 1/08 138/137 |

(Continued)

FOREIGN PATENT DOCUMENTS

| | | |
|---|---|---|
| CN | 1286640 C | 11/2004 |
| CN | 1558824 A | 12/2004 |

(Continued)

OTHER PUBLICATIONS

Lee et al., machine English translation of KR10-1168073 (Reg. No.), pub date Jul. 24, 2012.*

(Continued)

Primary Examiner — Michael F Pepitone
Assistant Examiner — Jessica M Rosewell
(74) Attorney, Agent, or Firm — Rothwell, Figg, Ernst & Manbeck, P.C.

(57) ABSTRACT

Disclosed herein is a hard coating composition used in forming a hard coating film exhibiting high hardness and excellent properties. The hard coating composition can be used to prepare a hard coating film exhibiting high impact resistance, high scratch resistance and high transparency and having excellent processability.

6 Claims, No Drawings

(56) References Cited

U.S. PATENT DOCUMENTS

| | | |
|---|---|---|
| 2010/0124631 A1 | 5/2010 | Horio et al. |
| 2010/0124656 A1 | 5/2010 | Horio et al. |
| 2010/0167068 A1 | 7/2010 | Horio |
| 2011/0050623 A1 | 3/2011 | Lee et al. |
| 2011/0124823 A1 | 5/2011 | Hayashi et al. |
| 2012/0019766 A1 | 1/2012 | Oki et al. |
| 2012/0034450 A1 | 2/2012 | Morita et al. |
| 2012/0128890 A1 | 5/2012 | Mirchev |
| 2014/0079937 A1 | 3/2014 | Jung et al. |
| 2015/0299507 A1 | 10/2015 | Kang et al. |

FOREIGN PATENT DOCUMENTS

| | | |
|---|---|---|
| CN | 1611968 A | 5/2005 |
| CN | 1898341 A | 1/2007 |
| CN | 1934140 A | 3/2007 |
| CN | 101701129 A | 5/2010 |
| CN | 102105515 A | 6/2011 |
| CN | 102257087 A | 11/2011 |
| EP | 0323560 A2 | 7/1989 |
| EP | 0442305 A2 | 8/1991 |
| EP | 0699704 A1 | 3/1996 |
| EP | 1162246 A1 | 12/2001 |
| EP | 2397527 A1 | 12/2011 |
| EP | 2 840 109 A1 | 2/2015 |
| EP | 2 840 110 A1 | 2/2015 |
| EP | 2840107 A1 | 2/2015 |
| EP | 2 842 989 A1 | 3/2015 |
| EP | 2843008 A1 | 3/2015 |
| EP | 2857440 A1 | 4/2015 |
| JP | 10-036540 A | 2/1998 |
| JP | H11-333370 A | 12/1999 |
| JP | 2000-015734 A | 1/2000 |
| JP | 2000015734 A | 1/2000 |
| JP | 2000-071392 A | 3/2000 |
| JP | 2000-214791 A | 8/2000 |
| JP | 2001-205179 A | 7/2001 |
| JP | 2001-323087 A | 11/2001 |
| JP | 2002-067238 A | 3/2002 |
| JP | 2002-338720 A | 11/2002 |
| JP | 2005-053094 A | 3/2005 |
| JP | 2007-145965 A | 6/2007 |
| JP | 2008-074112 A | 4/2008 |
| JP | 2008-075092 A | 4/2008 |
| JP | 4069499 B2 | 4/2008 |
| JP | 4075147 B2 | 4/2008 |
| JP | 4872893 B2 | 4/2008 |
| JP | 2008-116596 A | 5/2008 |
| JP | 2008116596 A | 5/2008 |
| JP | 2008-138165 A | 6/2008 |
| JP | 2008129130 A | 6/2008 |
| JP | 2008-150484 A | 7/2008 |
| JP | 2008197662 A | 8/2008 |
| JP | 2008-310286 A | 12/2008 |
| JP | 2009-025808 A | 2/2009 |
| JP | 2009-204725 A | 9/2009 |
| JP | 2009-204727 A | 9/2009 |
| JP | 2009204727 A | 9/2009 |
| JP | 2009-241458 A | 10/2009 |
| JP | 2009-255565 A | 11/2009 |
| JP | 2010-001431 A | 1/2010 |
| JP | 2010-017991 A | 1/2010 |
| JP | 2010-023507 A | 2/2010 |
| JP | 2010-024449 A | 2/2010 |
| JP | 2010-024450 A | 2/2010 |
| JP | 2010-052334 A | 3/2010 |
| JP | 2010-053231 A | 3/2010 |
| JP | 2010121013 A | 6/2010 |
| JP | 2010-173234 A | 8/2010 |
| JP | 2010-284910 A | 12/2010 |
| JP | 2011-031457 A | 2/2011 |
| JP | 2011-031527 A | 2/2011 |
| JP | 2011-505452 A | 2/2011 |
| JP | 2011022456 A | 2/2011 |
| JP | 2011504828 A | 2/2011 |
| JP | 2011-046917 A | 3/2011 |
| JP | 2011-126160 A | 6/2011 |
| JP | 2011-126164 A | 6/2011 |
| JP | 2011-126165 A | 6/2011 |
| JP | 2011-148301 A | 8/2011 |
| JP | 2011-523370 A | 8/2011 |
| JP | 2011-178910 A | 9/2011 |
| JP | 2011-201087 A | 10/2011 |
| JP | 2011-246548 A | 12/2011 |
| JP | 2012-027190 A | 2/2012 |
| JP | 2012-051118 A | 3/2012 |
| JP | 4911474 B2 | 4/2012 |
| JP | 2012066477 A | 4/2012 |
| JP | 2012-518713 A | 8/2012 |
| JP | 2012-206262 A | 10/2012 |
| JP | 2013-095108 A | 5/2013 |
| KR | 10-1999-0072670 A | 9/1999 |
| KR | 10-2000-0021805 A | 4/2000 |
| KR | 10-2000-0021806 A | 4/2000 |
| KR | 10-2004-0037081 A | 4/2004 |
| KR | 10-2004-0097189 A | 11/2004 |
| KR | 10-2006-0009194 A | 1/2006 |
| KR | 1020060072072 A | 6/2006 |
| KR | 100730414 B1 | 6/2007 |
| KR | 10-2008-0005839 A | 1/2008 |
| KR | 10-2008-0055698 A | 6/2008 |
| KR | 10-0852562 B1 | 8/2008 |
| KR | 100852561 B1 | 8/2008 |
| KR | 10-2008-0109658 A | 12/2008 |
| KR | 1020090006131 A | 1/2009 |
| KR | 10-0884079 B1 | 2/2009 |
| KR | 10-2009-0044089 A | 5/2009 |
| KR | 1020090045105 A | 5/2009 |
| KR | 1020090047529 A | 5/2009 |
| KR | 10-2009-0061821 A | 6/2009 |
| KR | 10-2009-0063182 A | 6/2009 |
| KR | 1020090061821 A | 6/2009 |
| KR | 10-2009-0073668 A | 7/2009 |
| KR | 10-0905683 B1 | 7/2009 |
| KR | 10-0926220 B1 | 11/2009 |
| KR | 10-2010-0026014 A | 3/2010 |
| KR | 10-2010-0041992 A | 4/2010 |
| KR | 10-2010-0055160 A | 5/2010 |
| KR | 1020100045997 A | 5/2010 |
| KR | 10-2010-0129512 A | 12/2010 |
| KR | 10-2010-0132786 A | 12/2010 |
| KR | 10-2011-0034324 A | 4/2011 |
| KR | 10-2011-0037622 A | 4/2011 |
| KR | 101028463 B1 | 4/2011 |
| KR | 10-2011-0058743 A | 6/2011 |
| KR | 10-2011-0071480 A | 6/2011 |
| KR | 10-2011-0103885 A | 9/2011 |
| KR | 1020110119704 A | 11/2011 |
| KR | 10-2011-0130142 A | 12/2011 |
| KR | 10-2012-0002366 A | 1/2012 |
| KR | 10-1127952 B1 | 3/2012 |
| KR | 101114932 B1 | 3/2012 |
| KR | 10-2010-0058635 A | 6/2012 |
| KR | 10-1150719 B1 | 6/2012 |
| KR | 10-1168073 B1 | 7/2012 |
| KR | 10-2012-0136597 A | 12/2012 |
| KR | 101295325 B1 | 8/2013 |
| TW | 200907401 A | 2/2009 |
| TW | 201041985 A | 12/2010 |
| TW | 201105694 A | 2/2011 |
| TW | 201130880 A | 9/2011 |
| TW | 201202403 A | 1/2012 |
| TW | I357922 B | 2/2012 |
| WO | 2006046855 A1 | 5/2006 |
| WO | 2007-081186 A1 | 7/2007 |
| WO | 2007-121102 A1 | 10/2007 |
| WO | WO 2008-098872 A1 | 8/2008 |
| WO | 2009-050957 A1 | 4/2009 |
| WO | 2010-035764 A1 | 4/2010 |
| WO | 2011-013611 A | 2/2011 |
| WO | 2011/105532 A1 | 9/2011 |
| WO | 2012-026475 A1 | 3/2012 |

(56) References Cited

FOREIGN PATENT DOCUMENTS

| WO | 2012/060145 A1 | 5/2012 |
|---|---|---|
| WO | 2012-066743 A1 | 5/2012 |
| WO | 2013/105656 A1 | 7/2013 |

OTHER PUBLICATIONS

Ahn et al., machine English translation of KR 10-2010-0132786, pub date Dec. 20, 2010.*
"Shin-Nakamura Chemical Co., Ltd." Product list, 2009.*
Amfine Chemical Corporation, "UV Absorbers" (http://www.amfine.com/uv_absorers.shtml), 2017.*
Written Opinion and Search Report issued in related international application No. PCT/KR2013/006778 dated Oct. 17, 2013 along with English translation, 17 pages.
Written Opinion and Search Report issued in related international application No. PCT/KR2013/006773 dated Oct. 22, 2013 along with English translation, 20 pages.
Written Opinion and Search Report issued in related international application No. PCT/KR2013/006775 dated Oct. 25, 2013 along with English translation, 25 pages.
Written Opinion and Search Report issued in related international application No. PCT/KR2013/006780 dated Nov. 27, 2013 along with English translation, 20 pages.
Written Opinion and Search Report issued in related international application No. PCT/KR2013/006781 dated Nov. 27, 2013 along with English translation, 18 pages.
Written Opinion and Search Report issued in related international application No. PCT/KR2013/006782 dated Nov. 27, 2013 along with English translation, 20 pages.
Extended European Search Report dated Dec. 17, 2015, issued in European Patent Application No. 13797819.3, 12 pages.
Extended European Search Report dated Dec. 17, 2015, issued in European Patent Application No. 13797572.8, 10 pages.
Extended European Search Report dated Jan. 8, 2016, issued in European Patent Application No. 13796271.8, 7 pages.
Extended European Search Report dated Jan. 29, 2016, issued in European Patent Application No. 13830624.6, 9 pages.
Extended European Search Report dated Dec. 22, 2015, issued in European Patent Application No. 13798019.9, 9 pages.
Extended European Search Report dated Jan. 8, 2016, issued in European Patent Application No. 13798121.3, 6 pages.
Extended European Search Report dated Jan. 8, 2016, issued in European Patent Application No. 13798100.7, 7 pages.
Extended European Search Report dated Mar. 11, 2016, issued in European Patent Application No. 13830272.4, 7 pages.
Extended European Search Report dated Mar. 14, 2016, issued in European Patent Application No. 13830709.5, 9 pages.
Extended European Search Report dated Mar. 15, 2016, issued in European Patent Application No. 13830681.6, 10 pages.
Extended European Search Report dated Apr. 4, 2016, issued in European Patent Application No. 13830724.4, 11 pages.
Extended European Search Report dated Apr. 6, 2016, issued in European Patent Application No. 13831327.5, 8 pages.
Communication from European Patent Office in corresponding application EP 13797819.3 dated Dec. 17, 2015, 12 pages.
Ciba Tinuvin 900 Light Stabilizer, Ciba Specialty Chemicals, 1997, pp. 1-3.
Shin-Nakamura Chemical Co., Ltd.; (2009); Product list; Retrieved from http://www.shin-nakamura.com/products/monomer-oligomer-07.html (2 pages).

* cited by examiner

HARD COATING COMPOSITION

CROSS REFERENCE TO RELATED APPLICATION(S)

This application is a 35 U.S.C § 371 National Phase Entry Application from PCT/KR2013/006773, filed on Jul. 29, 2013, which claims under 35 U.S.C § 119 priority to and the benefit of Korean Patent Application No. 10-2012-0092529, filed Aug. 23, 2012, and Korean Patent Application No. 10-2013-0089102, filed Jul. 26, 2013, the disclosures of which are incorporated herein by reference in their entireties

BACKGROUND OF THE INVENTION

1. Technical Field

The present invention relates to a hard coating composition. More particularly, the present invention relates to a hard coating composition that can be used in forming a hard coating film exhibiting excellent impact resistance and optical properties.

This application claims the benefit of Korean Patent Application No. 10-2012-0092529, filed on Aug. 23, 2012, and Korean Patent Application No. 10-2013-0089102, filed on Jul. 26, 2013, which are all hereby incorporated by reference in their entireties into this application.

2. Description of the Related Art

With the advance of mobile appliances such as smart phones, tablet PCs and the like, substrates for displays have recently been required to become lighter and slimmer. Display windows or front panels of such mobile appliances are generally made of glass or reinforced glass both of which have excellent mechanical properties. However, glass suffers from the disadvantage of being heavy and being easily broken by an external impact.

As an alternative to glass, plastic resin films have emerged. Their light weight and resistance to impact are consistent with the trend of pursuing lighter and slimmer mobile appliances. Particularly, a film with high hardness and wear resistance is required. In this regard, it is proposed to utilize a structure in which the substrate is coated with a hard coating layer.

First of all, increasing the thickness of the hard coating layer is considered as an approach to improving the surface hardness thereof. In fact, the hard coating layer should be of a minimal thickness to ensure the surface hardness of the hard coating layer. As the hard coating layer increases in thickness, the surface hardness thereof may become higher. However, a thicker hard coating layer, although increasing the surface hardness, is more prone to setting shrinkage which leads to wrinkling or curling with the concomitant production of cracks or exfoliations, and thus thick hard coating layers are difficult to employ in practice.

Recently, some methods have been proposed for conferring a high hardness on hard coating films, without the problems of cracking and setting shrinkage-induced curling. Korean Patent Application Publication No. 2010-0041992 discloses a hard coating film composition, free of monomers, comprising a binder resin based on ultraviolet-curable polyurethane acrylate oligomers. However, this hard coating film has a pencil hardness of about 3H, and thus the strength thereof is not sufficient to be a substitute for glass panels for displays.

SUMMARY OF THE INVENTION

Accordingly, the present invention has been made keeping in mind the above problems occurring in the prior art, and an object of the present invention is to provide a hard coating composition that can be used in forming a hard coating film exhibiting excellent impact resistance and optical properties.

In accordance with an aspect thereof, the present invention provides a hard coating composition, including: a mono- to hexa-functional acrylate monomer; a photocurable elastic polymer; a photoinitiator; and an organic solvent.

In accordance with another aspect thereof, the present invention provides a solvent-free hard coating composition, including: a mono- to hexa-functional acrylate monomer; a photocurable elastic polymer; and photoinitiator.

The hard coating composition can be used to prepare a hard coating film exhibiting high impact resistance, high scratch resistance and high transparency and having excellent processability. Therefore, a hard coating film prepared by the hard coating composition can be used as a substitute for glass in front panels or display panels of mobile appliances, display devices, instruments and the like because this hard coating film exhibits high impact resistance, high scratch resistance and high transparency.

DESCRIPTION OF THE PREFERRED EMBODIMENTS

The present invention pertains to a hard coating composition, including: a mono- to hexa-functional acrylate monomer; a photocurable elastic polymer; a photoinitiator; and an organic solvent.

Further, the present invention pertains to a solvent-free hard coating composition, including: a mono- to hexa-functional acrylate monomer; a photocurable elastic polymer; and photoinitiator.

As used herein, the words "first" and "second" are employed only to describe various elements, and intended to discriminate one element from another.

All of the terms used in the specification are taken only to illustrate embodiments, and are not intended to limit the present invention. As used herein and in the appended claims, the singular forms "a", "an", and "the" include plural reference unless the context clearly dictates otherwise.

Further, in the present invention, when it is mentioned that each constituent is formed "on", "over" or "above" each constituent, it means that each constituent is directly formed on each constituent or that another constituent is additionally formed between layers, on an object or on a substrate.

The above detailed descriptions of embodiments of the invention are not intended to be exhaustive or to limit the invention to the precise form disclosed above. While specific embodiments of, and examples for the invention are described above for illustrative purposes, various equivalent modifications are possible within the scope of the invention, as those skilled in the relevant art will recognize.

Hereinafter, the hard coating composition of the present invention will be described in detail.

In accordance with an aspect thereof, the present invention provides a hard coating composition, including: a mono- to hexa-functional acrylate monomer; a photocurable elastic polymer; a photoinitiator; and an organic solvent.

As used herein, the term "acrylate" is intended to encompass acrylate, methancrylate, and derivatives thereof with various substituents.

Examples of the mono- to hexa-functional acrylate monomers may include hydroxyethylacrylate (HEA), hydroxyethylmethacrylate (HEMA), hexandiol diacrylate (HDDA), tripropylene glycol diacrylate (TPGDA), ethylene glycol diacrylate (EGDA), trimethylolpropane triacrylate (TMPTA), trimethylolpropane ethoxytriacrylate (TMPEOTA), glycerin propoxylated triacrylate (GPTA), pentaerythritol tetraacrylate (PETA), and dipentaerythritol hexaacrylate (DPHA). These mono- to hexa-functional acrylate monomers may be used alone or in combination.

According to an embodiment of the present invention, the mono- to hexa-functional acrylate monomer may be included in an amount of about 20 to about 79.5 weight parts or about 20 to about 49.5 weight parts, based on 100 weight parts of a solid content of the mono- to hexa-functional acrylate monomer, the photocurable elastic polymer and the photoinitiator. When the amount of mono- to hexa-functional acrylate monomer is present in the above range, a hard coating film having excellent physical properties such as hardness, scratch resistance and the like can be formed.

The hard coating composition of the present invention includes a photocurable elastic polymer. As used herein, the term "photocurable elastic polymer" refers to a polymer which is of elasticity and contains a functional group that undergoes UV light-triggered crosslink polymerization. According to an embodiment of the present invention, the first photocurable elastic polymer may have an elongation of approximately 15% or more, for example, approximately 15 to 200%, approximately 20 to 200%, or approximately 20 to 150%, as measured according to ASTM D638.

The photocurable elastic polymer is crosslink-polymerized with the mono- to hexa-functional acrylate monomer and then photocured to form a hard coating layer, conferring flexibility and impact resistance to the hard coating film.

According to an embodiment of the present invention, the weight ratio of the photocurable elastic polymer to the mono- to hexa-functional acrylate monomer may be about 20:80 to about 80:20 or about 20:80 to about 50:50. When the photocurable elastic polymer and the tri- to hexa-functional acrylate-based monomer are crosslink-polymerized at the above weight ratio, a hard coating film exhibiting sufficient impact resistance and having excellent physical properties without deteriorating optical properties can be formed.

According to one embodiment of the present invention, the photocurable elastic polymer may be a polymer or oligomer having a weight average molecular weight of about 1,000 to about 600,000 g/mol or about 10,000 to about 600,000 g/mol.

The photocurable elastic polymer may be at least one selected from the group consisting of a polycaprolactone, a urethane acrylate polymer and a polyrotaxane.

Among the polymers used as the photocurable elastic polymer, the polycaprolactone is formed by the ring-opening polymerization of caprolactone, and has excellent physical properties such as flexibility, impact resistance, durability and the like.

Retaining a urethane bond therein, the urethane acrylate polymer has excellent elasticity and durability.

The polyrotaxane is a polymer of rotaxane, a mechanically-interlocked molecular architecture consisting of a dumbbell-shaped molecule which is threaded through a cyclic moiety (macrocycle). The two components of a rotaxane are kinetically trapped since the ends of the dumbbell (stoppers) are larger than the internal diameter of the ring and prevent disassociation of the components since this would require significant distortion of the covalent bonds.

According to an embodiment of the present invention, the photocurable elastic polymer may include a rotaxane comprising a cyclic moiety (macrocycle) in which lactone compounds with a (meth)acrylate moiety conjugated to the end thereof are bonded each other; a thread moiety held within the macrocycle; and stoppers provided at both ends of the thread moiety so as to prevent dissociation of the macrocycle.

No particular limitations are imposed on the macrocycle if it is large enough to surround the linear moiety. The macrocycle may include a functional group such as a hydroxide group, an amino group, a carboxyl group, a thiol group, an aldehyde group or the like, which can react with other polymers or compounds. Specific examples of the macrocycle may include α-cyclodextrin, β-cyclodextrin, γ-cyclodextrin and mixtures thereof.

Further, the thread may be used without limitation as long as it is generally linear in shape with a predetermined weight or greater. Preferably, a polyalkylene compound or a polylactone compound may be used in the thread. Specifically, a polyoxyalkylene compound including an oxyalkylene repetitive unit of 1 to 8 carbon atoms or a polylactone compound including a lactone repetitive unit of 3 to 10 carbon atoms may be used in the thread.

Meanwhile, the stopper may be appropriately adjusted depending on the characteristics of the rotaxane compound to be prepared. For example, the stopper may be at least one selected from the group consisting of a dinitrophenyl group, a cyclodextrin group, an amantane group, a trilyl group, a fluorescein group and a pyrene group.

Since the polyrotaxane has excellent scratch resistance, it can exhibit self-recovery ability when it is externally damaged and scratched.

According to the hard coating composition of the present invention, a hard coating layer containing the photocurable elastic polymer is formed by photocuring, thus allowing the hard coating layer to have high hardness and flexibility, particularly ensuring excellent resistance to external impact.

According to an embodiment of the present invention, the photocurable elastic polymer may be included in an amount of about 20 to about 79.5 weight parts or about 20 to about 49.5 weight parts, based on 100 weight parts of a solid content of the mono- to hexa-functional acrylate monomer, the photocurable elastic polymer and the photoinitiator. When the amount of the photocurable elastic polymer is excessively large, after the photocuring of the hard coating composition, the curling of the hard coating layer becomes serious, and the scratch resistance thereof becomes low, thus deteriorating the physical properties thereof. Further, when the amount thereof is extremely small, the impact resistance of the hard coating layer may be insufficient.

The hard coating composition of the present invention includes a photoinitiator.

According to an embodiment of the present invention, Examples of the photoinitiator may include, but are not limited to, 1-hydroxy-cyclohexyl-phenyl ketone, 2-hydroxy-2-methyl-1-phenyl-1-propanone, 2-hydroxy-1-[4-(2-hydroxyethoxy)phenyl]-2-methyl-1-propanone, methylbenzoylformate, α,α-dimethoxy-α-phenylacetophenone, 2-benzoyl-2-(dimethylamino)-1-[4-(4-morpholinyl)phenyl]-1-butanone, 2-methyl-1-[4-(methylthio)phenyl]-2-(4-morpholinyl)-1-propanone, diphenyl(2,4,6-trimethylbenzoyl)-phosphine oxide, bis(2,4,6-trimethylbenzoyl)-phenylphophine oxide, and the like. Further, the photoinitiator may be commercially available, such as those sold under brand name, Irgacure 184, Irgacure 500, Irgacure 651, Irgacure 369, Irgacure 907, Darocur 1173, Darocur MBF, Irgacure 819, Darocur TPO, Irgacure 907, and Esacure KIP 100F. These photoinitiators may be used alone or in combination.

According to an embodiment of the present invention, the photoinitiator may be included in an amount of about 0.5 to about 10 weight parts or about 1 to about 5 weight parts, based on 100 weight parts of a solid content of the mono- to hexa-functional acrylate monomer, the photocurable elastic polymer and the photoinitiator. When the amount of the photoinitiator is present in the above range, sufficient crosslink photopolymerization can be sufficiently conducted without deteriorating the physical properties of a hard coating film.

The hard coating composition of the present invention includes an organic solvent.

According to an embodiment of the present invention, examples of the organic solvent available in the present invention may include: alcohols such as methanol, ethanol, isopropyl alcohol, butanol and the like; alkoxy alcohols such as 2-methoxy ethanol, 2-ethoxy ethanol, 1-methoxy-2-propanol and the like; ketones such as acetone, methyl ethyl ketone, methyl isobutyl ketone, methyl propyl ketone, cyclohexanone and the like; ethers such as propyleneglycol monopropyl ether, propyleneglycol monomethyl ether, ethyleneglycolmonoethyl ether, ethyleneglycol monopropyl ether, ethyleneglycol monobutyl ether, diethyleneglycol monomethyl ether, diethyleneglycol monoethyl ether, diethyleneglycol monopropyl ether, diethyleneglycol monobutyl ether, diethyleneglycol-2-ethylhexyl ether and the like; and aromatic solvents such as benzene, toluene, xylene and the like. These organic solvents may be used alone or in combination.

According to an embodiment of the present invention, the amount of the organic solvent is not particularly limited because the amount thereof may be variously adjusted in the range of the physical properties of the hard coating composition being not deteriorated. The weight ratio of the solid content to the organic solvent may be about 70:30 to about 99:1, based on 100 weight parts of a solid content of the mono- to hexa-functional acrylate monomer, the photocurable elastic polymer and the photoinitiator. As described above, when the solid content thereof is high, a high-viscosity composition is obtained, and thus thick coating can be performed, thereby forming a thick hard coating layer having a thickness of 50 μm or more.

Meanwhile, the hard coating composition of the present invention may further include typical additives such as a surfactant, a yellowing inhibitor, a leveling agent, an antifouling agent and the like in addition to the above-mentioned components. Here, the content of the additive is may be variously adjusted to the degree that the physical properties of the hard coating composition are not degraded. Its content is not particularly limited, but preferably ranges from approximately 0.1 to 10 weight parts, based on 100 weight parts of the photocurable crosslinking copolymer.

According to an embodiment of the present invention, for example, the hard coating composition may include a surfactant as an additive. The surfactant may be a mono- or bi-functional fluorine acrylate, a fluorine surfactant, or a silicon surfactant. In this context, the surfactant may be contained in a dispersed or crosslinked form in the photocurable crosslinking copolymer.

Further, the hard coating composition may include a yellowing inhibitor as the additive. The yellowing inhibitor may be a benzophenone compound or a benzotriazole compound.

According to an embodiment of the present invention, the viscosity of the hard coating composition is not particularly limited as long as it has suitable fluidity and coatability, but the hard coating composition can exhibit relatively high viscosity. For example, the hard coating composition may have a viscosity of about 100 to about 1,200 cps, or about 150 to about 1,200 cps, or about 300 to about 1,200 cps at 25° C.

In accordance with another aspect thereof, the present invention provides a solvent-free hard coating composition, including: a mono- to hexa-functional acrylate monomer; a photocurable elastic polymer; and a photoinitiator.

Detailed description of the mono- to hexa-functional acrylate monomer, photocurable elastic polymer, photoinitiator, additive and the like of the solvent-free hard coating composition was aforementioned in the solvent-containing hard coating composition. However, the solvent-free hard coating composition can exhibit higher viscosity than the solvent-containing hard coating composition because it does not include an organic solvent. For example, the hard coating composition of the present invention may have a viscosity of about 300 to about 1,200 cps, about 500 to about 1,200 cps or about 800 to about 1,200 cps at 25° C.

The hard coating composition including the above-mentioned components is applied onto a supporting substrate and then photocured to form a hard coating layer.

As long as it is transparent, any plastic resin, whether capable of being stretched or not, may be used for a supporting substrate onto which the hard coating composition will be applied, without limitations imposed thereto. More specifically, the supporting substrate may include polyethyleneterephtalate (PET), a cyclic olefin copolymer (COC), polyacrylate (PAC), polycarbonate (PC), polyethylene (PE), polymethylmethacrylate (PMMA), polyetheretherketone (PEEK), polyethylenenaphthalate (PEN), polyetherimide (PEI), polyimide (PI), triacetylcellulose (TAC), methyl methacrylate (MMA) or the like. The supporting substrate may be a single layer structure, and, if necessary, may be a multilayer structure composed of the same or different materials, but is not particularly limited.

According to an embodiment of the present invention, the supporting substrate may be a multi-layered substrate of polyethylene terephthalate (PET) or a multi-layered substrate of coextruded polymethylmethacrylate (PMMA)/polycarbonate (PC).

According to another embodiment of the present invention, the supporting substrate may be a substrate including a copolymer of polymethylmethacrylate (PMMA) and polycarbonate (PC).

The thickness of the supporting substrate is not particularly limited, but may be about 30 to about 1,200 μm or about 50 to about 800 μm.

According to an embodiment of the present invention, the hard coating layer formed using the hard coating composition of the present invention may have a thickness of about 50 μm or more, for example, about 50 to about 300 μm, about 50 to about 200 μm, about 50 to about 150 μm or about 70 to about 150 μm.

The hard coating layer formed using the hard coating composition of the present invention can confer excellent impact resistance to a hard coating film because it absorbs an externally-applied impact.

In order to form a hard coating layer using the hard coating composition of the present invention, a general method used in the technical field related to the present invention may be used.

For example, first, the hard coating composition of the present invention is applied to one side of a supporting substrate. In this case, any method that is available in the art would be used in the application of the hard coating composition without particular limitations. For example, the hard coating composition may be applied by bar coating, knife coating, roll coating, blade coating, die coating, microgravure coating, comma coating, slot die coating, lip coating, solution casting or the like.

Subsequently, the applied hard coating composition is irradiated with ultraviolet light to be photocured, thus forming a hard coating layer.

In this way, a hard coating layer having excellent impact resistance may be formed using the hard coating composition of the present invention.

According to an embodiment of the present invention, the hard coating layer formed using the hard coating composition of the present invention may be formed on the other side of the supporting substrate including another coating layer formed on one side thereof.

The hard coating film including the hard coating layer formed using the hard coating composition of the present invention can be usefully used in various fields because it exhibits high hardness, scratch resistance, transparency, durability, light resistance and light transmission.

The impact resistance of the hard coating film including the hard coating layer formed using the hard coating composition of the present invention is high enough to be a substitute for glass. For example, the hard coating film including the hard coating layer formed using the hard coating composition of the present invention may not crack even after a steel bead weighing 22 g is freely dropped ten times from a height of 50 cm thereto.

Further, the hard coating layer formed using the hard coating composition of the present invention may allow two or less scratches to appear thereon after it is doubly rubbed 400 times with a steel wool #0000 under a load of 500 g.

Further, the hard coating layer formed using the hard coating composition of the present invention may have a light transmittance of 91.0% or more or 92.0% or more and a haze of 1.0 or less, 0.5 or less or 0.4 or less.

Further, the hard coating layer formed using the hard coating composition of the present invention may have an initial color b* value of 1.0 or less. Further, in the hard coating layer formed using the hard coating composition of the present invention, the difference between the initial color b* value and a color b* value after exposure to UV B for 72 hrs may be 0.5 or less or 0.4 or less.

Further, when the hard coating film including the hard coating layer formed using the hard coating composition of the present invention is disposed on a plane after exposure to a temperature of 50° C. or higher at a humidity of 80% or higher for 70 hrs, the maximum distance at which each edge or side of the hard coating film is spaced apart from the plane may be about 1.0 mm or less, about 0.6 mm or less, or about 0.3 mm or less. More particularly, when the hard coating film including the hard coating layer formed using the hard coating composition of the present invention is disposed on a plane after exposure to a temperature of 50° C. to 90° C. at a humidity of 80% to 90% for 70 to 100 hrs, each edge or side of the hard coating film is spaced apart from the plane by about 1.0 mm or less, about 0.6 mm or less, or about 0.3 mm or less, maximally.

As described above, the hard coating film including the hard coating layer formed using the hard coating composition of the present invention can be used in various fields because it exhibits high hardness, high impact resistance, high scratch resistance, high transparency, high durability, high light resistance and high transmittacne. For example, this hard coating film can be used in touch panels of mobile terminals, smart phones or tablet PCs and covers of displays or devices.

A better understanding of the present invention may be obtained through the following examples which are set forth to illustrate, but are not to be construed as limiting the present invention.

EXAMPLES

Preparation Example 1: Preparation of Photocurable Elastic Polymer

In a reactor, 50 g of a caprolactone-grafted polyrotaxane polymer [A1000, Advanced Soft Material INC] was mixed with 4.53 g of Karenz-AOI [2-acryloylethyl isocyanate, Showadenko Inc.], 20 mg of dibutyltin dilaurate [DBTDL, Merck Corp.], 110 mg of hydroquinone monomethylene ether, and 315 g of methyl ethyl ketone. Then, the mixture was reacted at 70° C. for 5 hrs to obtain polyrotaxane in which polylactone with an acrylate moiety conjugated to the end thereof acted as the macrocycle while cyclodextrin was positioned as the stopper.

The polyrotaxane had a weight average molecular weight of 600,000 g/mol, and was found to have an elongation of 20%, as measured according to ASTM D638.

Example 1

A first hard coating composition was prepared by mixing 6 g of trimethylolpropane triacrylate (TMPTA), 4 g of the polyrotaxane prepared in Preparation Example 1, 0.2 g of a photoinitiator (brand name: Darocur TPO), 0.1 g of a benzotriazole-based yellowing inhibitor (brand name: Tinuvin 400), 0.05 g of a fluorine surfactant (brand name: FC4430), and 1 g of methylethylketone.

A second hard coating composition was prepared by mixing g of hydroxyethyl acrylate (HEA), 8 g of a silica-dipentaerythritolhexacrylate (DPHA) composite in which silica nanoparticles with a particle size of 20-30 nm were dispersed by 40 wt % (silica 3.2 g, DPHA 4.8 g), 0.2 g of a photoinitiator (brand name: Darocur TPO), 0.1 g of a benzotriazole-based yellowing inhibitor (brand name: Tinuvin 400) and 0.05 g of a fluorine surfactant (brand name: FC4430).

The second hard coating composition was applied to one side of a PET substrate 188 μm thick with a size of 15 cm×20 cm, and then subjected to first photocuring by exposure to 280-350 nm UV light from a black light fluorescence lamp.

Subsequently, the first hard coating composition was applied to the other side of the PET substrate, and then subjected to second photocuring by exposure to 280-350 nm UV light from a black light fluorescence lamp to prepare a hard coating film. After completion of the photocuring of the first and second hard coating compositions, the thicknessess of first and second hard coating layers formed on both sides of the PET substrate were 100 μm, respectively.

Example 2

A hard coating film was prepared in the same manner as in Example 1, with the exception that 4 g of a urethane acrylate polymer (brand name: UA200PA, Shinnakamura Chemicals Corp., weight average molecular weight: 2,600 g/mol, elongation measured according to ASTM D638: 170%) was used instead of 4 g of the polyrotaxane of Preparation Example 1 in the first hard coating composition.

Example 3

A hard coating film was prepared in the same manner as in Example 1, with the exception that 4 g of a urethane acrylate polymer (brand name: UA340PA, Shinnakamura Chemicals Corp., weight average molecular weight: 13,000 g/mol, elongation measured according to ASTM D638: 150%) was used instead of 4 g of the polyrotaxane of Preparation Example 1 in the first hard coating composition.

Example 4

A hard coating film was prepared in the same manner as in Example 1, with the exception that 8 g of a silica-trimethylolpropanetriacrylate (TMPTA) composite in which silica nanoparticles with a particle size of 20-30 nm were dispersed by 40 wt % (silica 3.2 g, TMPTA 4.8 g) was used instead of 8 g of a silica-dipentaerythritolhexacrylate (DPHA) composite in which silica nanoparticles with a particle size of 20-30 nm were dispersed by 40 wt % (silica 3.2 g, DPHA 4.8 g) in the second composition.

Example 5

A hard coating film was prepared in the same manner as in Example 1, with the exception that each of the first and the second hard coating layers formed on both sides of the PET substrate had a thickness of 150 μm after completion of the photocuring.

Example 6

A first hard coating composition was prepared by mixing 5 g of trimethylolpropane triacrylate (TMPTA), 5 g of the polyrotaxane prepared in Preparation Example 1, 0.2 g of a photoinitiator (brand name: Darocur TPO), 0.1 g of a benzotriazole-based yellowing inhibitor (brand name: Tinuvin 400), 0.05 g of a fluorine surfactant (brand name: FC4430), and 1 g of methylethylketone.

A second hard coating composition was prepared by mixing 2 g of hydroxyethyl acrylate (HEA), 8 g of a silica-dipentaerythritolhexacrylate (DPHA) composite in which silica nanoparticles with a particle size of 20-30 nm were dispersed by 40 wt % (silica 3.2 g, DPHA 4.8 g), 0.2 g of a photoinitiator (brand name: Darocur TPO), 0.1 g of a benzotriazole-based yellowing inhibitor (brand name: Tinuvin 400) and 0.05 g of a fluorine surfactant (brand name: FC4430).

The second hard coating composition was applied to one side of a PET substrate 188 μm thick with a size of 15 cm×20 cm, and then subjected to first photocuring by exposure to 280-350 nm UV light from a black light fluorescence lamp.

Subsequently, the first hard coating composition was applied to the other side of the PET substrate, and then subjected to second photocuring by exposure to 280-350 nm UV light from a black light fluorescence lamp to prepare a hard coating film. After completion of the photocuring of the first and second hard coating compositions, the thickness of the first coating layer was 125 μm, and the thickness of the second coating layer was 100 μm.

Comparative Example 1

The second hard coating composition of Example 1 was applied to one side of a PET substrate 188 μm thick with a size of 15 cm×20 cm, and then subjected to first photocuring by exposure to 280-350 nm UV light from a black light fluorescence lamp.

Subsequently, the second hard coating composition of Example 1 was applied to the other side of the PET substrate, and then subjected to second photocuring by exposure to 280-350 nm UV light from a black light fluorescence lamp to prepare a hard coating film. After completion of the photocuring of the first and second hard coating compositions, the thicknessess of first and second hard coating layers formed on both sides of the PET substrate were 100 μm, respectively.

Comparative Example 2

A first hard coating composition was prepared by mixing 10 g of trimethylolpropane triacrylate (TMPTA), 0.2 g of a photoinitiator (brand name: Darocur TPO), 0.1 g of a benzotriazole-based yellowing inhibitor (brand name: Tinuvin 400), 0.05 g of a fluorine surfactant (brand name: FC4430), and 1 g of methylethylketone.

A second hard coating composition was prepared in the same manner as in Example 1, and other processes were also carried out in the same manner as in Example 1 to prepare a hard coating film.

The components and contents of the first and second hard coating compositions of Examples 1 to 6 and Comparative Examples 1 and 2 are summarized in Table 1 below.

TABLE 1

| | First hard coating layer | | | | Second hard coating layer | | |
| --- | --- | --- | --- | --- | --- | --- | --- |
| | photocurable | | | | | | |
| No. | acrylate monomer | elastic polymer | inorganic particles | thickness | acrylate monomer | inorganic particles | thickness |
| Ex. 1 | TMPTA 6 g | polyrotaxane 4 g | — | 100 μm | DPHA 4.8 g, HEA 2 g | 3.2 g | 100 μm |
| Ex. 2 | TMPTA 6 g | UA200PA 4 g | — | 100 μm | DPHA 4.8 g, HEA 2 g | 3.2 g | 100 μm |
| Ex. 3 | TMPTA 6 g | UA340P 4 g | — | 100 μm | DPHA 4.8 g, HEA 2 g | 3.2 g | 100 μm |
| Ex. 4 | TMPTA 6 g | polyrotaxane 4 g | — | 100 μm | TMPTA 4.8 g, HEA 2 g | 3.2 g | 100 μm |
| Ex. 5 | TMPTA 6 g | polyrotaxane 4 g | — | 150 μm | DPHA 4.8 g, HEA 2 g | 3.2 g | 150 μm |

TABLE 1-continued

| | First hard coating layer | | | | Second hard coating layer | | |
| | photocurable | | | | | | |
| No. | acrylate monomer | elastic polymer | inorganic particles | thickness | acrylate monomer | inorganic particles | thickness |
|---|---|---|---|---|---|---|---|
| Ex. 6 | TMPTA 5 g | polyrotaxane 5 g | — | 125 μm | DPHA 4.8 g, HEA 2 g | 3.2 g | 100 μm |
| C. Ex. 1 | DPHA 4.8 g, HEA 2 g | — | 3.2 g | 100 μm | DPHA 4.8 g, HEA 2 g | 3.2 g | 100 μm |
| C. Ex. 2 | TMPTA 10 g | — | 3.2 g | 100 μm | DPHA 4.8 g, HEA 2 g | 3.2 g | 100 μm |

TEST EXAMPLES

<Measuring Method>

1) Pencil Hardness

Pencil hardness was evaluated according to the Japanese Standard JIS K5400. In this regard, the second hard coating layer of the hard coating film was doubly rubbed three times with a pencil hardness meter under a load of 1.0 kg to determine the hardness at which no scratches appeared.

2) Scratch Resistance

The second hard coating layer of the hard coating film was doubly rubbed 400 times with a steel wool (#0000) under a load of 0.5 kg in a friction tester, and scratches thus formed were evaluated. Evaluation was made of the scratch resistance of the films by marking O for two or less scratches, Δ for two to less than five scratches, and x for five or more scratches.

3) Light Resistance

Differences in color b* value of the hard coating films were measured before and after exposure to UVB from UV lamp for 72 hrs.

4) Transmittance and Haze

The hard coating films were measured for transmittance and haze using a spectrophotometer (brand name: CHO-400).

5) Curl Property at High Humidity and Temperature

After a hard coating film piece with dimensions of 10 cm×10 cm was stored for 72 hrs in a chamber maintained at a temperature of 85° C. and a humidity of 85%, it was placed on a flat plane. A maximal distance at which each edge of the piece was spaced apart from the plane was measured.

6) Cylindrical Bending Test

Each of the hard coating films was wound on a cylindrical mandrel having a diameter of 1 cm such that the first hard coating layer was positioned as the outermost layer. When the hard coating film was not cracked, it was evaluated as OK. If the hard coating film was cracked, it was evaluated as X.

7) Impact Resistance

The impact resistance of each of the hard coating films was evaluated by determining whether or not each of the hard coating films was cracked when a 22 g steel ball was freely dropped 10 times on the second hard coating layer from a height of 50 cm. Each of the hard coating films was evaluated as OK when it was not cracked, and as X when cracked.

The results of the physical properties measured in each of the hard coating films are summarized in Table 2 below.

TABLE 2

| | Ex. 1 | Ex. 2 | Ex. 3 | Ex. 4 | Ex. 5 | Ex. 6 | C. Ex. 1 | C. Ex. 2 |
|---|---|---|---|---|---|---|---|---|
| Pencil hardness | 9H | 9H | 9H | 8H | 9H | 9H | 9H | 9H |
| Scratch resistance | ○ | ○ | ○ | ○ | ○ | ○ | Δ | ○ |
| Light resistance | 0.20 | 0.24 | 0.21 | 0.18 | 0.25 | 0.30 | 0.20 | 0.16 |
| Transmittance | 92.1 | 92.3 | 92.0 | 92.5 | 92.0 | 92.0 | 92.2 | 92.1 |
| Haze | 0.3 | 0.4 | 0.3 | 0.3 | 0.4 | 0.4 | 0.4 | 0.3 |
| Bending test | OK | OK | OK | OK | OK | OK | OK | X |
| Curl property at high humidity & temperature | 0.4 mm | 0.4 mm | 0.3 mm | 0.2 mm | 0.4 mm | 0.5 mm | 0.3 mm | 0.6 mm |
| Impact resistance | OK | OK | OK | OK | OK | OK | X | X |

As shown in Table 2 above, it can be ascertained that all of the hard coating films of Examples 1 to 6 exhibited good physical properties. In contrast, the hard coating films of Comparative Examples 1 and 2, each of which does not include a photocurable crosslinking copolymer of a mono- to hexa-functional acrylate monomer and a photocurable elastic polymer, were found to be insufficient in impact resistance.

What is claimed is:

1. A hard coating composition, comprising:
a tri- to hexa-functional acrylate monomer;
a photocurable elastic polymer having an elongation of 15 to 200%, as measured according to ASTM D638;

a photoinitiator; and an organic solvent, wherein the tri- to hexa-functional acrylate monomer includes at least one selected from the group consisting of trimethylolpropane triacrylate (TMPTA), pentaerythritol tetraacrylate (PETA), and dipentaerythritol hexaacrylate (DPHA), wherein the photocurable elastic polymer includes at least one selected from the group consisting of a polycaprolactone and a polyrotaxane, wherein the hard coating composition comprises 20 to 79.5 weight parts of the tri- to hexa-functional acrylate monomer, 20 to 79.5 weight parts of the photocurable elastic polymer and 0.5 to 10 weight parts of the photoinitiator, based on 100 weight parts of a solid content of the tri- to hexa-functional acrylate monomer, the photocurable elastic polymer and the photoinitiator, and wherein a weight ratio of the solid content to the organic solvent is 70:30 to 99:1.

2. The hard coating composition of claim 1, wherein a weight ratio of the photocurable elastic polymer to the tri- to hexa-functional acrylate monomer is 20:80 to 80:20.

3. The hard coating composition of claim 1, wherein the photocurable elastic polymer includes polyrotaxane, and the polyrotaxane includes a macrocycle in which lactone compounds with a (meth)acrylate moiety conjugated to the end thereof are bonded each other; a thread moiety held within the macrocycle; and stoppers provided at both ends of the thread moiety so as to prevent dissociation of the macrocycle.

4. The hard coating composition of claim 1, further comprising an additive.

5. The hard coating composition of claim 4, wherein the additive includes at least one selected from the group consisting of a mono- to di-functional fluorine-based acrylate, a fluorine-based surfactant and a silicon-based surfactant, or includes a yellowing inhibitor including a benzophenone compound or a benzotriazole compound.

6. The hard coating composition of claim 1, wherein the hard coating composition has a viscosity of 100 to 1,200 cps at a temperature of 25° C.

* * * * *